(12) United States Patent
Kato et al.

(10) Patent No.: US 12,005,576 B2
(45) Date of Patent: Jun. 11, 2024

(54) TEACHING SYSTEM

(71) Applicant: KAWASAKI JUKOGYO KABUSHIKI KAISHA, Kobe (JP)

(72) Inventors: Tomoki Kato, Kobe (JP); Tsuyoshi Tagashira, Kobe (JP); Atsushi Kameyama, Kobe (JP); Masao Aramoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 350 days.

(21) Appl. No.: 17/608,849

(22) PCT Filed: May 20, 2020

(86) PCT No.: PCT/JP2020/019930
§ 371 (c)(1),
(2) Date: Nov. 4, 2021

(87) PCT Pub. No.: WO2020/241413
PCT Pub. Date: Dec. 3, 2020

(65) Prior Publication Data
US 2022/0305644 A1 Sep. 29, 2022

(30) Foreign Application Priority Data
May 24, 2019 (JP) ................. 2019-097369

(51) Int. Cl.
*B25J 9/16* (2006.01)
*B25J 13/06* (2006.01)

(52) U.S. Cl.
CPC ........... *B25J 9/1602* (2013.01); *B25J 9/1674* (2013.01); *B25J 13/06* (2013.01)

(58) Field of Classification Search
CPC ........ B25J 9/1602; B25J 9/1674; B25J 19/06; B25J 13/06; B25J 9/1664; B25J 9/0084;
(Continued)

(56) References Cited

U.S. PATENT DOCUMENTS 5,025,393 A * 6/1991 Naito ................... G05B 19/425
901/3
6,804,580 B1 * 10/2004 Stoddard ................ B25J 9/1669
318/568.13
(Continued)

FOREIGN PATENT DOCUMENTS

DE 10 2016 100 175 A1 7/2016
DE 10 2016 010 051 B4 7/2018
(Continued)

OTHER PUBLICATIONS

Nakamura et al., Controller for industrial robots, 1986, IEEE, p. 254-259 (Year: 1986).*
(Continued)

*Primary Examiner* — Mcdieunel Marc
(74) *Attorney, Agent, or Firm* — Oliff PLC

(57) ABSTRACT

A teaching system configured to teach operation to a plurality of robots includes a first controlling device which determines whether a first robot and a second robot are in an enabled state where the first and second robots are permitted to operate, and when the first controlling device determines as in the enabled state, the first controlling device transmits an enable signal indicative of permitting the second robot to operate and enables the first robot to be taught the operation when a teaching terminal specifies the first robot. When a second controlling device receives the enable signal from the first controlling device and the teaching terminal specifies the second robot, the second controlling device enables the second robot to be taught the operation.

7 Claims, 3 Drawing Sheets

(58) Field of Classification Search
CPC ........ G05B 19/425; G05B 2219/39448; G05B 2219/39384; G05B 2219/39443; G05B 2219/36401

See application file for complete search history.

(56) References Cited

U.S. PATENT DOCUMENTS

| | | | | |
|---|---|---|---|---|
| 6,853,881 | B2* | 2/2005 | Watanabe | G05B 19/425 318/568.22 |
| 7,164,971 | B2* | 1/2007 | Ferla | H01H 9/0214 700/61 |
| 8,655,429 | B2* | 2/2014 | Kuduvalli | B25J 9/1682 600/407 |
| 8,745,789 | B2* | 6/2014 | Saracen | B66C 23/48 5/601 |
| 9,513,607 | B2* | 12/2016 | Mizuura | G05B 11/01 |
| 10,452,939 | B2* | 10/2019 | Tani | G06T 7/74 |
| 10,649,431 | B2* | 5/2020 | Huettner | B25J 13/006 |
| 10,667,871 | B2* | 6/2020 | Romo | A61B 10/04 |
| 2005/0166413 | A1* | 8/2005 | Crampton | G01B 5/008 33/503 |
| 2010/0268386 | A1 | 10/2010 | Kiyota | |
| 2011/0282490 | A1* | 11/2011 | Weigele | B25J 9/1674 700/250 |
| 2015/0239120 | A1 | 8/2015 | Yamamoto | |
| 2016/0193730 | A1 | 7/2016 | Kawase | |
| 2017/0057083 | A1 | 3/2017 | Maeda | |

FOREIGN PATENT DOCUMENTS

| | | |
|---|---|---|
| EP | 1 782 928 B1 | 5/2008 |
| JP | 2007-268662 A | 10/2007 |
| JP | 2010-247279 A | 11/2010 |
| JP | 2015-157325 A | 9/2015 |
| WO | WO2009/119384 A1 | 7/2011 |

OTHER PUBLICATIONS

Fukui et al., Requirement of three-position enabling switches for installing in enabling devices to achieve operational safety of robotics and automation applications, 2007, IEEE, p. 111-116 (Year: 2007).*

Alves et al., Environment for Teaching and Development of Mobile Robot Systems, 2010, IEEE, p. 302-307 (Year: 2010).*

Le et al., Graphical simulator for teaching robot with parallel wire type teaching device, 2017, IEEE, p. 233-236 (Year: 2017).*

* cited by examiner

TEACHING SYSTEM

This is a National Phase of International Patent Application No. PCT/JP2020/019930 filed May 20, 2020, which claims priority to Japanese Patent Application No. 2019-097369 filed May 24, 2019. The disclosure of the prior applications is hereby incorporated by reference herein in its entirety.

TECHNICAL FIELD

The present disclosure relates to a teaching system.

BACKGROUND ART

Conventionally, a teaching system which teaches operation to a plurality of robots is known. Patent Document 1 discloses a robot system as one example of such a teaching system.

The robot system disclosed in Patent Document 1 is provided with a first robot, a first controlling device connected to the first robot, and a first teaching terminal connected to the first controlling device. Moreover, the robot system is further provided with a second robot, a second controlling device connected to the second robot, and a second teaching terminal connected to the second controlling device. Moreover, the robot system is further provided with a third robot, a third controlling device connected to the third robot, and a third teaching terminal connected to the third controlling device. The first to third controlling devices communicate via a communication device. The first to third teaching terminals have first to third enabling devices which determine whether to permit the first to third robots to operate during teaching in a teaching mode, respectively.

REFERENCE DOCUMENT OF CONVENTIONAL ART

Patent Document

[Patent Document 1] JP2010-247279A

DESCRIPTION OF THE DISCLOSURE

Problem to be Solved by the Disclosure

However, in the teaching system disclosed in Patent Document 1 and other conventional teaching systems, generally, the enabling devices are connected to the first to third teaching terminals, respectively. Then, each of the first to third controlling devices determines, based on the enabling device connected to the controlling device, whether the robot connected to the controlling device is in an enabled state in which the robot is permitted to operate. Thus, in the conventional teaching systems, processing to teach operation to the plurality of robots may be complicated.

Therefore, one purpose of the present disclosure is to provide a teaching system capable of teaching operation to a plurality of robots by simple processing.

SUMMARY OF THE DISCLOSURE

In order to solve the problem, a teaching system according to the present disclosure teaches operation to a plurality of robots. The system includes a first controlling device configured to control the operation of a first robot of the plurality of robots, a second controlling device configured to control the operation of a second robot of the plurality of robots, a teaching terminal connected to the first controlling device to teach the operation to the first and second robots, and a first communication device configured to perform data communication between the first controlling device and the second controlling device. The first controlling device determines whether the first and second robots are in an enabled state where the first and second robots are permitted to operate, and when the first controlling device determines as in the enabled state, the first controlling device transmits an enable signal indicative of permitting the second robot to operate and enables the first robot to be taught the operation when the teaching terminal specifies the first robot. When the second controlling device receives the enable signal from the first controlling device and the teaching terminal specifies the second robot, the second controlling device enables the second robot to be taught the operation.

According to this configuration, the first controlling device can determine whether the first and second robots are in the enabled state where their operation is permitted. When the first controlling device determines as in the enabled state, it transmits to the second controlling device the enable signal indicating that the operation of the second robot is permitted. Therefore, it becomes possible to teach the operation to the plurality of robots by simple processing.

The first controlling device may determine whether the first and second robots are in the enabled state based on a reception status of a safety signal indicating that the operation is safely teachable to the first and second robots. The safety signal may include at least one of a first safety signal based on a state of the first robot, a second safety signal based on a state of the second robot, and a third safety signal based on whether an emergency switch is pressed down, the emergency switch being configured to suppress the operation of the first and second robots.

According to this configuration, it becomes possible to more safely teach the operation to the plurality of robots.

The safety signal may include all of the first to third safety signals. The first controlling device may determine as not in the enabled state when the first controlling device does not receive at least one of the first to third safety signals.

According to this configuration, even though the safety signal includes all of the first to third safety signals, it becomes possible to teach the operation to the plurality of robots by the simple processing.

The emergency switch may be provided at least to the teaching terminal.

According to this configuration, it becomes possible to more safely teach the operation to the plurality of robots.

The first and second robots may be disposed in the same work area, and a periphery of the work area may be defined by a safety fence.

According to this configuration, it becomes possible to more safely teach the operation to the plurality of robots.

The second robot may include a plurality of second robots. The second controlling device may be provided to each of the plurality of second robots.

According to this configuration, it becomes possible to teach more variety of operation.

For example, a second communication device configured to perform data communication between the plurality of second controlling devices may further be provided.

Effect of the Disclosure

According to the present disclosure, a teaching system capable of teaching operation to a plurality of robots by simple processing can be provided.

Figure 1:
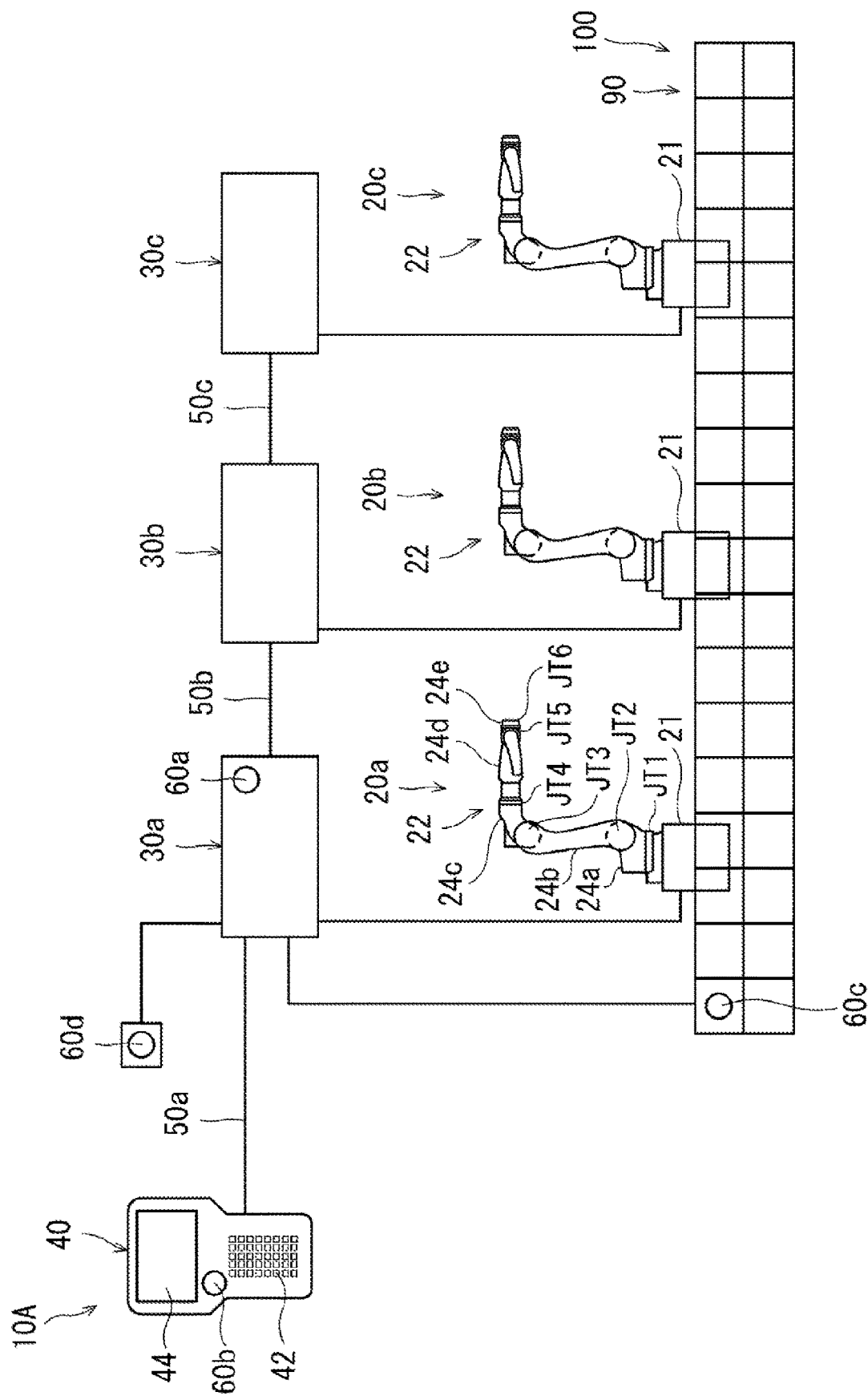
FIG. 1 is a schematic view illustrating the entire configuration of a teaching system according to one embodiment of the present disclosure.

MODES FOR CARRYING OUT THE DISCLOSURE (Entire Configuration)

Hereinafter, a teaching system according to one embodiment of the present disclosure is described with reference to the drawings. Note that the present disclosure is not limited to this embodiment. Moreover, the same reference characters are given to the same or corresponding elements throughout the drawings to omit redundant description.
(Teaching System10)

FIG. 1 is a schematic view illustrating the entire configuration of the teaching system according to this embodiment. As illustrated in FIG. 1, a teaching system 10A according to this embodiment is used to teach operation to three robots 20a to 20c disposed in the same work area 100. A periphery of the work area 100 is defined by a safety fence 90.

The teaching system 10A is provided with a controlling device 30a (first controlling device) which controls operation of the robot 20a (first robot), a controlling device 30b (second controlling device) which controls operation of the robot 20b (second robot), and a controlling device 30b (second controlling device) which controls operation of the robot 20c (second robot).
(Robots 20a-20c)

The robots 20a to 20c are each configured as a vertically articulated robot, and have the same structure. Therefore, here, only the robot 20a is described, and similar description is not repeated for the robots 20b and 20c. Moreover, in order to avoid complication in appearance, in FIG. 1, detailed reference characters are given only to components of the robot 20a, and detailed reference characters for the components of the robots 20b and 20c are omitted.

The robot 20a has a pedestal 21 and a robotic arm 22 attached to an upper surface of the pedestal 21. The robotic arm 22 is configured as a vertically articulated robot having six joint shafts (axes) JT1 to JT6, and six links 24a to 24e which are sequentially coupled to each other by the joint shafts JT1 to JT6. Note that the joint shafts JT1 to JT6 are each driven by a servomotor (not illustrated).

The joint shaft JT1 couples the pedestal 21 and a base-end part of the link 24a so as to be rotatable about a vertical axis. The joint shaft JT2 couples a tip-end part of the link 24a and a base-end part of the link 24b so as to be rotatable about a horizontal axis. The joint shaft JT3 couples a tip-end part of the link 24b and a base-end part of the link 24c so as to be rotatable about a horizontal axis.

The joint shaft JT4 couples a tip-end part of the link 24c and a base-end part of the link 24d so as to be rotatable about an axis extending in a longitudinal direction of the link 24c. The joint shaft JT5 couples a tip-end part of the link 24d and a base-end part of the link 24e so as to be rotatable about an axis extending perpendicularly to a longitudinal direction of the link 24d. The joint shaft JT6 couples a tip-end part of the link 24e and a base-end part of an end effector (not illustrated) so as to be rotatable in a twisting manner.

Here, for example, when the components of the robot 20a are not failed, and the robot 20a is not in contact with a human body or an object other than a workpiece, the state of the robot 20a can be defined as favorable. On the other hand, for example, when the components of the robot 20a are failed, or the robot 20a is in contact with the human body or the object other than the workpiece, the state of the robot 20a can be defined as unfavorable.

Note that, whether the components of the robot 20a are failed can be detected based on, for example, information on a rotational position of the servomotor provided to each of the joint shafts JT1 to JT6, and a magnitude of a current value flowing in each component. Moreover, whether the robot 20a is in contact with the human body or the object other than the workpiece can be detected by a contact sensor provided to the robot 20a.

Then, for example, when the robot 20a detects that it is in the favorable state, it transmits a first safety signal indicative of this state to the controlling device 30a. On the other hand, when the robot 20a detects that it is in the unfavorable state, it does not transmit the first safety signal to the controlling device 30a. In this manner, the robot 20a can transmit its state to the controlling device 30a.

Whether the robot 20b is in the favorable state can be defined similarly to the case of the robot 20a. When the robot 20b detects that it is in the favorable state, it transmits a second safety signal indicative of this state to the controlling device 30a via the controlling device 30b and a communication device 50b (described later). On the other hand, when the robot 20b detects that it is in the unfavorable state, it does not transmit the second safety signal to the controlling device 30a. In this manner, the robot 20b can transmit its state to the controlling device 30a.

Whether the robot 20c is in the favorable state can be defined similarly to the case of the robots 20a and 20b. When the robot 20c detects that it is in the favorable state, it transmits the second safety signal indicative of this state to the controlling device 30a via the controlling devices 30b and 30c, the communication device 50b, and a communication device 50c (described later). On the other hand, when the robot 20c detects that it is in the unfavorable state, it does not transmit the second safety signal to the controlling device 30a. In this manner, the robot 20c can transmit its state to the controlling device 30a.
(Controlling Devices 30a-30c)

The controlling devices 30a to 30c are placed outside the safety fence 90. The robot controlling devices 30a to 30c can control operation of the respective robotic arms 22 connected thereto by servo-controlling the servomotors provided to the joint shafts JT1 to JT6 of each robotic arm 22. The controlling device 30a has a storage device, a memory, and a processor (none of them are illustrated). The storage device stores information on the rotational positions of the servomotors provided to the respective joint shafts JT1 to JT6, thus, a position and a posture of the robot 20a when the robot 20a is operated based on a command value of a teach pendant 40 (described later). The memory stores a program, and the processor executes the program stored in the memory.

The controlling device 30a is provided with an emergency-stop switch 60a (emergency switch) which stops the operation of the robots 20a to 20c. Here, when the emergency-stop switch 60a is not pressed down (in other words, during a normal operation), it transmits a third safety signal indicative of this state to the controlling device 30a. On the other hand, when the emergency-stop switch 60a is pressed down (in other words, in an emergency), it does not transmit the third safety signal to the controlling device 30a. In this manner, the emergency-stop switch 60a can transmit to the controlling device 30a whether the emergency-stop switch 60a is pressed down. Note that, since emergency-stop switches 60b to 60d (described later) are similar to this, description thereof is omitted below.

(Teach Pendant 40)

The teaching system10A is further provided with the teach pendant 40 (teaching terminal) connected to the controlling device 30a so as to teach operation to the robots 20a to 20c. The teach pendant 40 can switch, for example, between a teaching mode in which operation is taught to the robots 20a to 20b, and a repeating mode in which the operation taught in the teaching mode is repeatedly performed by the robots 20a to 20b.

The teach pendant 40 includes a button group 42 and a touch panel 44. An operator operates the button group 42 to switch between the teaching mode and the repeating mode, and to input the command value to the robots 20a to 20c. The touch panel 44 displays the information inputted through the button group 42 and information on a basic setting, and is also inputtable of the basic setting etc., by being operated by the operator. Moreover, the teach pendant 40 is provided with the emergency-stop switch 60b (emergency switch) which stops the operation of the robots 20a to 20c.

(Communication Devices 50a-50c)

The teaching system 10A is further provided with a communication device 50a which performs data communication between the teach pendant 40 and the controlling device 30a, the communication device 50b (first communication device) which performs data communication between the controlling device 30a and the controlling device 30b, and the communication device 50c (second communication device) which performs data communication between the controlling device 30b and the controlling device 30c. For example, the communication devices 50a to 50c may each be implemented using a LAN cable based on standards for Ethernet®.

Note that, for example, a communication device which performs data communication between the controlling device 30a and the robot 20a, a communication device which performs data communication between the controlling device 30b and the robot 20b, and a communication device which performs data communication between the controlling device 30c and the robot 20c may also each be implemented using a LAN cable based on standards for Ethernet®.

(Emergency-Stop Switches 60c and 60d)

The teaching system 10A is further provided with the emergency-stop switches 60c and 60d (emergency switches) which stop operation of the robots 20a to 20c. The emergency switch 60c is provided to the safety fence 90. Moreover, the emergency-stop switch 60d may be provided, for example, outside the work area 100 and on a wall surface standing within a range where the work area 100 is visible.

(Teaching Mode by Teaching System 10A)

Next, one example of a teaching mode performed by the teaching system 10A according to this embodiment is described.

The controlling device 30a can determine whether the robots 20a to 20c are in the enabled state where they are permitted to operate. In detail, the controlling device 30a can determine whether the robots 20a to 20c are in the enabled state, based on a reception status of the first to third safely signals indicating that operation can safely be taught to the robots 20a to 20c.

The controlling device 30a determines as in the enabled state when it receives all of the first to third safety signals. When the controlling device 30a determines as in the enabled state, it transmits to the controlling devices 30b and 30c an enable signal indicative of the enabled state (an enable signal indicative of permitting the second robot to operate). Therefore, the controlling device 30a can share the recognition of being in the enable state, with the controlling devices 30b and 30b.

Moreover, when the controlling device 30a determines as in the enabled state, and the robot 20a is specified by the teach pendant 40 in the teaching mode, the controlling device 30a enables the robot 20a to be taught the operation by the teach pendant 40. Then, the controlling device 30a operates the robot 20a based on the command value of the teach pendant 40, and stores the position and posture of the robot 20a so that the operation of the robot 20a can be taught by the teach pendant 40.

On the other hand, when the controlling device 30a does not receive at least one of the first to third safety signals, it determines as not in the enabled state. When the controlling device 30a determines as not in the enabled state, it does not transmit the enable signal to the robots 20b and 20c. Note that, even if the robot 20a is specified by the teach pendant 40 in the teaching mode when the controlling device 30a determines as not in the enable state, the robot 20a is not operated. Accordingly, when the controlling device 30a determines as not in the enabled state, it disables the robot 20a to be taught the operation by the teach pendant 40.

When the controlling device 30b receives the enable signal from the controlling device 30a, and the robot 20b is specified by the teach pendant 40 in the teaching mode, the controlling device 30b enables the robot 20b to be taught the operation by the teach pendant 40. Then, the controlling device 30b operates the robot 20b based on the command value of the teach pendant 40, and stores the position and posture of the robot 20b so that the operation of the robot 20b can be taught by the teach pendant 40.

On the other hand, even if the robot 20b is specified by the teach pendant 40 in the teaching mode when the controlling device 30b does not receive the enable signal, the robot 20b is not operated. Accordingly, when the controlling device 30b does not receive the enable signal, it disables the robot 20a to be taught the operation by the teach pendant 40. Note that, since this is similarly applied to a case where the controlling device 30c receives the enable signal from the controlling device 30a, here, description is not repeated.

(Effects)

In this embodiment, the controlling device 30a can determine whether the robots 20a to 20c are in the enabled state where their operation is permitted. When the controlling device 30a determines as in the enabled state, it transmits to the controlling devices 30b and 30c the enable signal indicating that the operation of the robots 20a to 20c is permitted. Therefore, the teaching system 10A according to this embodiment can teach operation to a plurality of robots by simple processing.

Moreover, in this embodiment, the controlling device 30a can determine whether to be in the enabled state based on the reception status of the safely signal indicating that operation can safely be taught to the robots 20a to 20c. Moreover, since the safety signal includes the first to third safety signals, the teaching system 10A according to this embodiment can further safely teach operation to the robots 20a to 20c.

Moreover, in this embodiment, the controlling device 30a determines as not in the enabled state when it does not receive at least one of the first to third safety signals. Therefore, even though the safety signal includes all of the first to third safety signals, operation can be taught to the robots 20a to 20c by the simple processing.

Moreover, in the teaching system 10A according to this embodiment, when the operator presses down any of the emergency-stop switches 60a to 60d in an emergency, not all of the third safety signals are transmitted to the controlling device 30a. Therefore, the controlling device 30a determines as not in the enabled state, and operation is not taught to the robots 20a to 20c by the teach pendant 40. As a result, the teaching system 10A can more safely teach operation to the robots 20a to 20c.

Moreover, in this embodiment, not only the robot 20b but also the robot 20c is provided. Furthermore, not only the robot 20b being provided with the controlling device 30b, but also the robot 20c is provided with the controlling device 30c (a plurality of second robots are provided, and the second controlling device is provided to each of the plurality of second robots). Therefore, the teaching system 10A according to this embodiment can teach various operations.

(Modifications)

It is apparent for a person skilled in the art from the above description that many improvements and other embodiments of the present disclosure are possible. Therefore, the above description is to be interpreted only as illustration, and it is provided in order to teach a person skilled in the art the best mode for implementing the present disclosure. The details of the structures and/or the functions may be substantially changed, without departing from the spirit of the present disclosure.

(Modification 1)

Figure 2:
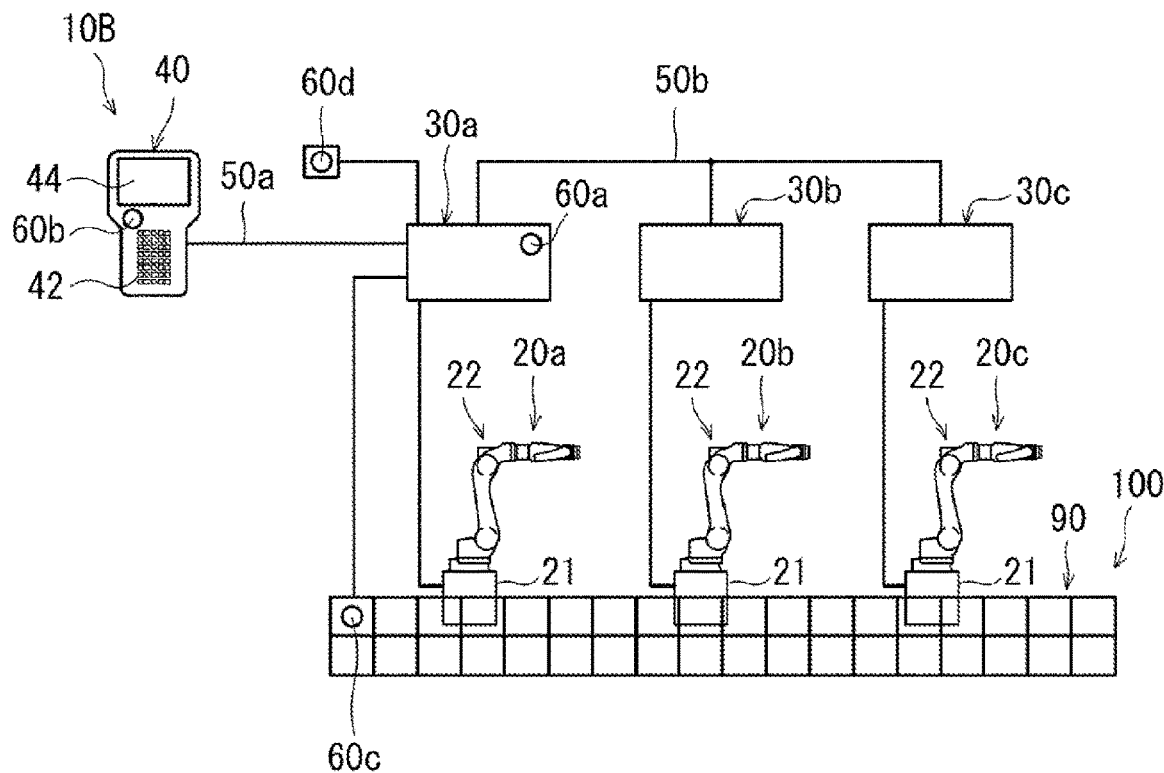
FIG. 2 is a schematic view illustrating the entire configuration of Modification 1 of the teaching system according to this embodiment of the present disclosure.

Modification 1 of the teaching system according to the above embodiment is described with reference to FIG. 2. FIG. 2 is a schematic view illustrating the entire configuration of Modification 1 of the teaching system according to the embodiment. Note that a teaching system 10B according to this modification has the same configuration as the teaching system 10A according to the above embodiment, except for a mode of connecting the controlling device 30a to the controlling devices 30b and 30c. Therefore, the same reference characters are given to the same parts and similar description is not repeated.

In the embodiment described above, the controlling device 30c (second controlling device) is connected to the controlling device 30a (first controlling device) via the communication devices 50b and 50c (first and second communication devices), and the controlling device 30b (second controlling device). On the other hand, as illustrated in FIG. 2, in this modification, the controlling device 30c is connected to the controlling device 30a only via the communication device 50b, and the communication device 50c is not provided. The controlling device 30a may be connected to the controlling devices 30b and 30c in this mode.

(Modification 2)

Figure 3:
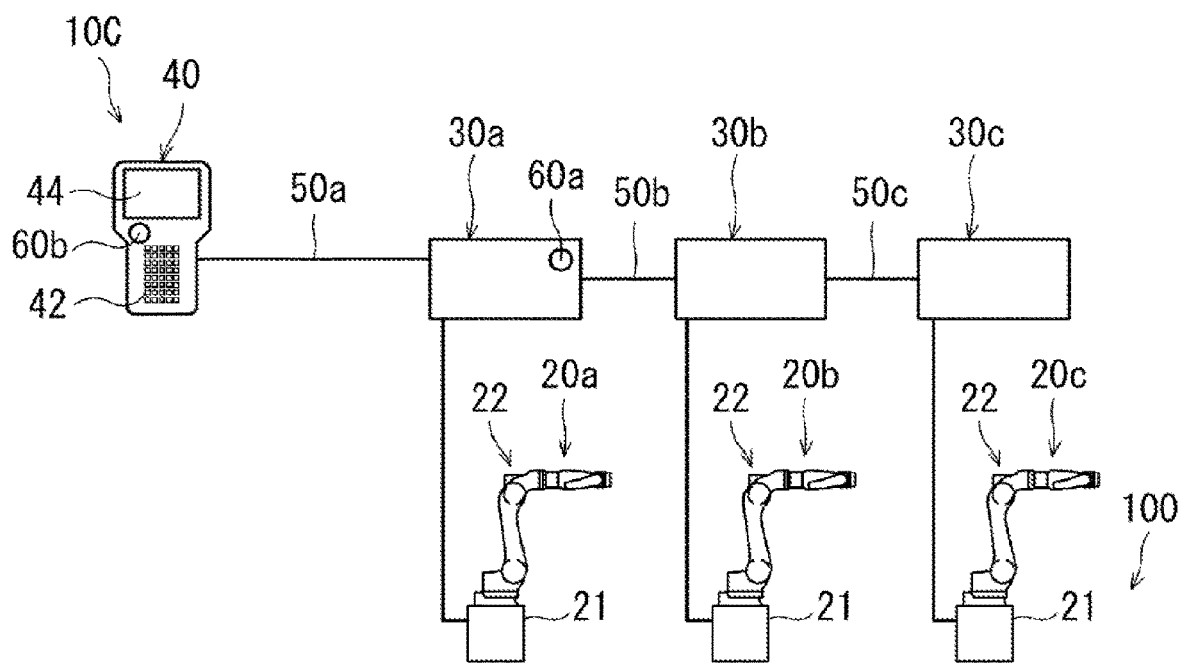
FIG. 3 is a schematic view illustrating the entire configuration of Modification 2 of the teaching system according to this embodiment of the present disclosure.

Modification 2 of the teaching system according to the above embodiment is described with reference to FIG. 3. FIG. 3 is a schematic view illustrating the entire configuration of Modification 2 of the teaching system according to the embodiment described above. Note that a teaching system 10C according to this modification has the same configuration as the teaching system 10A according to the above embodiment, except for not being provided with the safety fence 90 and the emergency-stop switch 60d. For example, such a configuration simplifies the configuration of the teaching system 10C.

(Modification 3)

Figure 4:
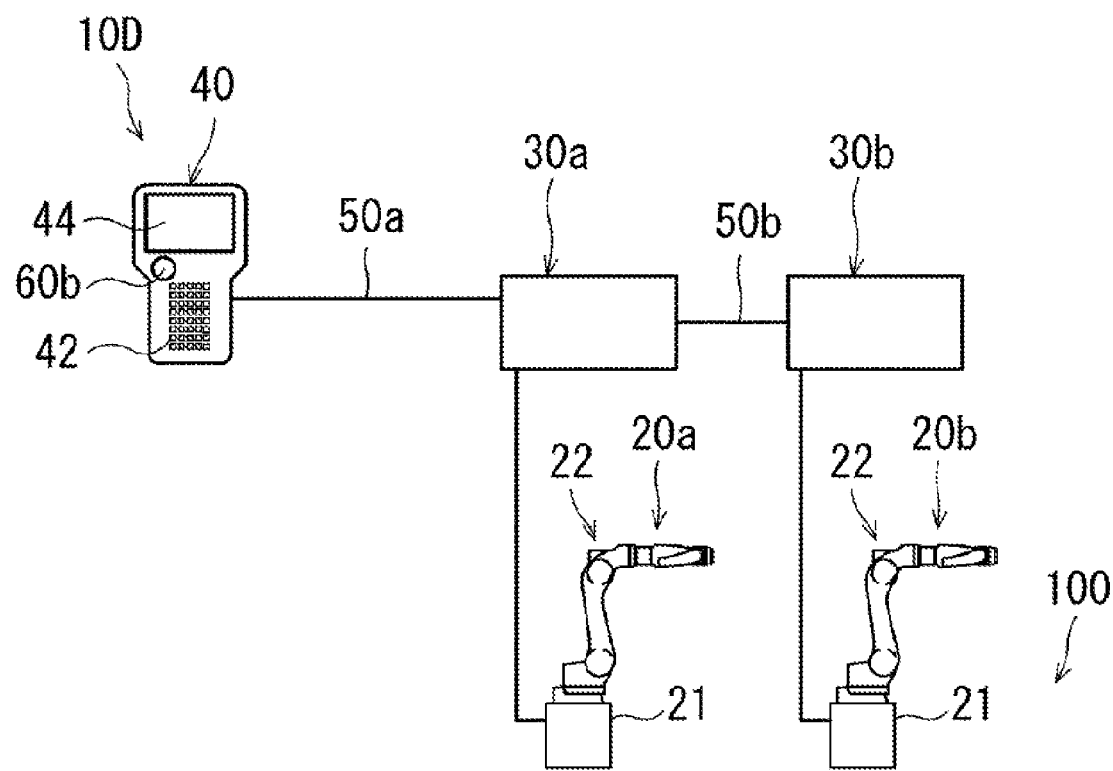
FIG. 4 is a schematic view illustrating the entire configuration of Modification 3 of the teaching system according to this embodiment of the present disclosure.

Modification 3 of the teaching system according to the above embodiment is described with reference to FIG. 4. FIG. 4 is a schematic view illustrating the entire configuration of Modification 3 of the teaching system according to the embodiment described above. Note that a teaching system 10D according to this modification has the same configuration as the teaching system 10A according to the above embodiment, except for not being provided with the robot 20c, the controlling device 30c, the communication device 50c, the safety fence 90, and the emergency-stop switches 60a and 60d. For example, such a configuration further simplifies the configuration of the teaching system 10C.

(Other Modifications)

In the embodiment and modifications described above, the cases are described, where two second robots are provided and the second controlling device is provided to each of the two second robots, and where a single second robot is provided and one second controlling device is provided to the single second robot. However, it is not limited to the case, but three or more second robots may be provided, and the second controlling device may be provided to each of the three or more robots. In such a case, only the first communication device which performs data communication between the first controlling device and all of the three or more second controlling devices may be provided. Alternatively, the first communication device which performs data communication between the first controlling device and one second controlling device, and a plurality of second communication devices which perform data communication between the three or more second controlling devices, may be provided. Note that, in order to perform data communication between adjacent second controlling devices, one second communication device may be provided between the adjacent second controlling devices.

Although in the embodiment and modifications described above the first and second robots are each configured as a vertically articulated robot having the same structure, it is not limited to the case. For example, the first and second robots may each be configured as a horizontally articulated robot, a polar coordinate robot, a cylindrical coordinate robot, a Cartesian coordinate robot, or other robots. Moreover, the first robot and the second robot may have different structures.

In the embodiment and modifications described above, the emergency switch is configured as the emergency-stop switch which stops operation of the first and second robots. However, it is not limited to the case, but the emergency switch may be an emergency switch which suppresses operation of the first and second robots in methods other than stopping it.

In the embodiment and modifications described above, the emergency switch is provided to any of the first controlling device, the teaching terminal, the safety fence, and the wall surface standing within the range where the work area is visible. However, it is not limited to the case, but the emergency switch may be provided to the second controlling device, to the first and second robots, or to other locations.

In the embodiment and modifications described above, the enable signal transmitted by the first controlling device to the second controlling device is a signal indicating that the first and second robots are in the enabled state where they are permitted to operate. However, it is not limited to the case, but the enable signal may be a signal indicating that the second robot is permitted to operate, other than in the enabled state.

Although in the embodiment and modifications described above the communication devices 50a to 50c are each implemented using the LAN cable based on standards for Ethernet®, it is not limited to the case. For example, each of the communication devices 50a to 50c may be implemented using a wireless LAN.

Although in the embodiment and modifications described above only the first and second robots are disposed in the work area, it is not limited to the case. For example, a belt conveyor may be disposed in the work area. The belt conveyor may, for example, transmit to the first controlling device a fourth safety signal indicating that the belt conveyor itself is in a favorable state (in other words, it is not failed etc.). On the other hand, when the belt conveyor is in an unfavorable state (in other words, when it is failed etc.), the belt conveyor may not transmit the fourth safety signal to the first controlling device. In this manner, the belt conveyor can transmit its state to the first controlling device. Then, when the first controlling device receives all of the first to fourth safety signals, it may determine as in the enabled state.

The invention claimed is:

1. A teaching system configured to teach operation to a plurality of robots, comprising:
    a first controlling device configured to control the operation of a first robot of the plurality of robots;
    a second controlling device configured to control the operation of a second robot of the plurality of robots;
    a teaching terminal connected to the first controlling device to teach the operation to the first and second robots;
    a plurality of emergency switches each of which is configured to suppress the operation of the first and second robots; and
    a first communication device configured to perform data communication between the first controlling device and the second controlling device, wherein
    the teaching terminal and the plurality of emergency switches are connected to the first controlling device and are not connected to the second controlling device,
    the first controlling device determines whether the first and second robots are in an enabled state where the first and second robots are permitted to operate, and when the first controlling device determines the first and second robots are as-in the enabled state, the first controlling device transmits an enable signal indicative of permitting the second robot to operate and enables the first robot to be taught the operation when the teaching terminal specifies the first robot, and
    when the second controlling device receives the enable signal from the first controlling device and the teaching terminal specifies the second robot, the second controlling device enables the second robot to be taught the operation.

2. The teaching system of claim 1, wherein
the first controlling device determines whether the first and second robots are in the enabled state based on a reception status of a safety signal indicating that the operation is safely teachable to the first and second robots, and
the safety signal includes at least one of:
    a first safety signal based on a state of the first robot;
    a second safety signal based on a state of the second robot; and
    a third safety signal based on whether any of the emergency switches is pressed down.

3. The teaching system of claim 2, wherein
the safety signal includes all of the first to third safety signals, and
the first controlling device determines the first and second robots are not in the enabled state when the first controlling device does not receive at least one of the first to third safety signals.

4. The teaching system of claim 1, wherein each emergency switch is provided at least to the teaching terminal.

5. The teaching system of claim 1, wherein
the first and second robots are disposed in the same work area, and
a periphery of the work area is defined by a safety fence.

6. The teaching system of claim 1, wherein
the second robot includes a plurality of second robots, and
the second controlling device is provided to each of the plurality of second robots.

7. The teaching system of claim 6, further comprising a second communication device configured to perform data communication between the plurality of second controlling devices.

* * * * *